(12) United States Patent
Saquib

(10) Patent No.: US 7,869,094 B2
(45) Date of Patent: Jan. 11, 2011

(54) SELECTIVE DITHERING

(75) Inventor: Suhail S. Saquib, Shrewsbury, MA (US)

(73) Assignee: Mitcham Global Investments Ltd. (VG)

( * ) Notice: Subject to any disclaimer, the term of this patent is extended or adjusted under 35 U.S.C. 154(b) by 1653 days.

(21) Appl. No.: 11/031,690

(22) Filed: Jan. 7, 2005

(65) Prior Publication Data

US 2006/0152766 A1    Jul. 13, 2006

(51) Int. Cl.
H04N 1/405    (2006.01)
(52) U.S. Cl. .................. 358/3.13; 358/3.14; 358/3.15; 358/3.16; 358/3.17; 358/3.18; 345/596; 345/616; 382/270; 382/252
(58) Field of Classification Search ......... 358/3.06–3.2, 358/3.01, 1.9, 1.1, 1.19, 534–536; 706/51, 706/46, 45; 348/222.1, 220.1, 207.99; 382/237, 382/232, 270, 252; 345/596, 616
See application file for complete search history.

(56) References Cited

U.S. PATENT DOCUMENTS

| | | | |
|---|---|---|---|
| 4,442,433 A | 4/1984 | Myers et al. | 343/378 |
| 4,524,447 A | 6/1985 | Willis et al. | 375/26 |
| 4,558,356 A | 12/1985 | Toda et al. | 358/75 |
| 4,631,521 A | 12/1986 | El-Sherbini | 340/347 DD |
| 4,910,603 A | 3/1990 | Hirahara et al. | 358/298 |
| 4,926,251 A | 5/1990 | Sekizawa et al. | 358/75 |
| 5,014,333 A | 5/1991 | Miller et al. | 382/54 |
| 5,053,887 A | 10/1991 | Thompson | 358/457 |
| 5,072,291 A | 12/1991 | Sekizawa | 358/75 |
| 5,125,045 A | 6/1992 | Murakami et al. | 382/50 |
| 5,182,652 A | 1/1993 | Stephenson, III | 358/296 |
| 5,319,742 A | 6/1994 | Edgar | 395/131 |
| 5,361,142 A | 11/1994 | Semasa | 358/455 |
| 5,371,515 A | 12/1994 | Wells et al. | 345/149 |
| 5,384,582 A | 1/1995 | Keith et al. | 345/199 |
| 5,398,120 A | 3/1995 | Friedman et al. | 358/501 |
| 5,398,297 A | 3/1995 | Clark et al. | 358/298 |
| 5,438,649 A * | 8/1995 | Ruetz | 358/1.9 |
| 5,455,600 A | 10/1995 | Friedman et al. | 345/153 |

(Continued)

FOREIGN PATENT DOCUMENTS

EP    0 441 609 A2    8/1991

(Continued)

Primary Examiner—David K Moore
Assistant Examiner—Benjamin O Dulaney
(74) Attorney, Agent, or Firm—Lowe Hauptman Ham & Berner, LLP

(57) ABSTRACT

Techniques are disclosed for selectively dithering only a subset of a digital image. One or more ranges of digits are selected for dithering. Only those pixels having digits within the selected range(s) in the digital image are dithered. The image is printed after being selectively dithered. Digits may be selected for dithering if they have values within the range (s) of one or more non-monotonic regions of a printer transfer function. Dithering may be performed on the subset of the digital image by applying a nonlinear transformation is applied to the image and adding a dither pattern to the transformed image. The result is quantized, and the inverse of the nonlinear transformation is applied to the quantized image to produce a dithered image. The nonlinear transformation is constructed such that the effects of the dither pattern appear only in that subset of the image having digits in the selected range(s).

17 Claims, 12 Drawing Sheets

U.S. PATENT DOCUMENTS

| | | | | |
|---|---|---|---|---|
| 5,457,772 | A | 10/1995 | Shannon | 395/109 |
| 5,495,346 | A | 2/1996 | Choi et al. | 358/457 |
| 5,517,584 | A | 5/1996 | Jennings | 382/276 |
| 5,553,200 | A * | 9/1996 | Accad | 358/1.9 |
| 5,559,323 | A * | 9/1996 | Campi et al. | 250/214.1 |
| 5,835,117 | A * | 11/1998 | Small | 347/183 |
| 5,838,462 | A * | 11/1998 | Ebner et al. | 358/3.23 |
| 5,898,821 | A | 4/1999 | Brandkamp | 395/109 |
| 5,926,570 | A * | 7/1999 | Smitt | 382/237 |
| 5,988,504 | A * | 11/1999 | Smitt | 382/237 |
| 6,222,945 | B1 * | 4/2001 | Cheung et al. | 382/260 |
| 6,256,111 | B1 * | 7/2001 | Rijavec | 358/1.9 |
| 6,552,822 | B1 * | 4/2003 | Kishimoto | 358/3.03 |
| 6,819,450 | B1 * | 11/2004 | Jolley et al. | 358/1.8 |
| 7,012,639 | B1 * | 3/2006 | Ishikawa et al. | 348/222.1 |
| 2002/0159094 | A1 | 10/2002 | Bybell et al. | 358/3.06 |
| 2002/0176102 | A1 * | 11/2002 | Denton et al. | 358/1.9 |
| 2003/0007185 | A1 | 1/2003 | Aozzi | 358/3.06 |
| 2003/0128378 | A1 * | 7/2003 | Cooper et al. | 358/1.9 |
| 2004/0080517 | A1 * | 4/2004 | Song et al. | 345/596 |
| 2004/0170338 | A1 * | 9/2004 | Maurer | 382/260 |
| 2004/0174549 | A1 | 9/2004 | Shigeta | 358/1.9 |
| 2005/0156767 | A1 * | 7/2005 | Melanson | 341/143 |
| 2005/0156772 | A1 * | 7/2005 | Melanson | 341/143 |
| 2006/0087305 | A1 * | 4/2006 | Talanov et al. | 324/71.1 |

FOREIGN PATENT DOCUMENTS

EP  0 441 609 A3  8/1991

* cited by examiner

SELECTIVE DITHERING

BACKGROUND

1. Field of the Invention

The present invention relates to image processing and, more particularly, to techniques for preparing digital images for printing.

2. Related Art

Various kinds of printers are well-known in the computing and digital image arts. Such printers include, for example, dot-matrix printers, laser printers, inkjet printers, and thermal printers. Digital printers typically produce printed images by printing dots arranged in a two-dimensional grid. In general, any particular printer is capable of printing dots having a particular range of densities. Variation in printed density level may be achieved by means of two general methods. In the first method, the coverage of pigment/dye is approximately constant over the whole area of a pixel, and the amount of pigment (the pigment "density") of approximately constant coverage varies according to the amount of input energy. This method is hereinafter referred to as "variable density" printing. In the second method, the size of dots within the area of one pixel varies according to input energy, these dots containing only essentially a single density of pigment (de facto, its maximum density). The dots are so small that they cannot be individually distinguished by the naked eye, and so the overall density level is perceived as an average of the almost total absorption of light in the proportion of the viewed area occupied by dots, and the almost complete (diffuse) reflection of light in unprinted areas. This technique is known hereinafter as "variable dot" printing.

Both variable dot and variable density printing are capable of generating multiple gray levels by varying the energy provided to the printer. The number of gray levels that can be produced using either method, however, is limited by the manner in which each method provides energy to the printer.

A technique referred to as "dithering" can be used to increase the printer's effective number of gray levels by introducing noise into the image using repeating patterns referred to as "dithering patterns," "halftones," or "screens."

The size of the repeating pattern defines a superpixel that is larger than the native pixel of the printer. The number of gray levels can be increased by varying the pattern in the superpixel, with the size of the repeating pattern defining the number of gray levels that can be added. Although the number of gray levels can therefore be increased by increasing the size of the superpixel, if the superpixel is too large the repeating pattern may itself become visible, thereby producing undesirable visual artifacts. Therefore, when selecting a size for the superpixel, it is necessary to perform a tradeoff between the number of gray levels that can be obtained and the visibility of the repeating pattern.

Referring to FIG. 1A, a functional block diagram is shown of a prior art printing system 100a. The system 100a includes a print engine 102. The print engine 102 receives input energy 104 and produces a corresponding density 106 as output, such as by printing a single dot. Note that the input energy 104 may represent a plurality of input energies and that the output density 106 may represent a plurality of corresponding output densities. Note further that the techniques described with respect to FIG. 1A and elsewhere may be applied either to a single color or to a plurality of colors.

Although some printers may be capable of printing densities in response to a continuous range of input energies, digital images are discretized. Referring to FIG. 1B, a functional block diagram is shown of a prior art system 100b for printing a digital image 110. The system 100b includes a digital printer 108 which includes the print engine 102. The printer 108 includes a digit-to-energy converter 112, which converts the input digital image 110 into the input energy 104. The print engine 102 produces the output density 106 in response to the input energy 104, as described above.

The print engine 102 may fail to implement an optimal transfer function for a variety of reasons, such as imperfections introduced during the manufacturing process. Referring to FIG. 1C, a functional block diagram is shown of a prior art system 100c in which the printer 108 additionally includes a calibration function 114 to compensate for such imperfections. The calibration function 114 receives the digital image 110 as input and produces a calibrated digital image 116 as output. The calibrated digital image 116, rather than the original digital image 110, is then provided to the digit-to-energy converter 112, and the output densities 106 are then produced in the manner described above. Note that the calibration function 114 (FIG. 1C) may be combined with the digit-to-energy converter 112 (FIG. 1B), and that the resulting combination may be implemented within the printer 108.

The behavior of the printer 108 implicitly defines a transfer function relating input digits (e.g., in the digital image 110) to output densities 106. It is desirable that such a transfer function be monotonic across the full range of input digits. For a variety of reasons, however, the observed transfer function in actual printers may contain non-monotonicities. In other words, increasing digit values may not necessarily cause increasing output densities. As a result, the printed image may include visual artifacts, such as color discontinuities, that detract from the quality of the image.

The printer 108 may also exhibit other undesirable behavior leading to sub-optimal output. For example, it is desirable that the printer 108 always produce the same output density for a particular input digit. For certain ranges of input digits, however, the printer 108 may not reliably produce the same output density each time a particular digit is provided as input. For example, consider the simple case of a bi-level printer in which a digit value of 1 is intended to cause the printer 108 to print a single dot. When provided with an input digit value of 1 multiple times, the printer 108 may in fact print a dot some of the time and not print a dot at other times. Such a phenomena may manifest itself as visible "grain" in the printed image, thereby detracting from overall image quality.

What is needed, therefore, are techniques for improving the perceived quality of color characteristics of printed digital images.

SUMMARY

Techniques are disclosed for selectively dithering only a subset of a digital image. One or more ranges' of digits are selected for dithering. Only those pixels having digits within the selected range(s), in the digital image are dithered. The image is printed after being selectively dithered. Digits may be selected for dithering if they have values within the range(s) of one or more non-monotonic regions of a printer transfer function. Dithering may be performed on the subset of the digital image by applying a nonlinear transformation to the image and adding a dither pattern to the transformed image. The result is quantized, and the inverse of the nonlinear transformation is applied to the quantized image to produce a dithered image. The nonlinear transformation is constructed such that the effects of the dither pattern appear only in that subset of the image having digits in the selected range(s).

Other features and advantages of various aspects and embodiments of the present invention will become apparent from the following description and from the claims.

DETAILED DESCRIPTION

Techniques are disclosed for selectively dithering only a subset of a digital image. One or more ranges of digits are selected for dithering. Only those pixels having digits within the selected range(s) in the digital image are dithered. The image is printed after being selectively dithered. Digits may be selected for dithering if they have values within the range (s) of one or more non-monotonic regions of a printer transfer function. Dithering may be performed on the subset of the digital image by applying a nonlinear transformation to the image and adding a dither pattern to the transformed image. The result is quantized, and the inverse of the nonlinear transformation is applied to the quantized image to produce a dithered image. The nonlinear transformation is constructed such that the effects of the dither pattern appear only in that subset of the image having digits in the selected range(s).

Figure 3A:
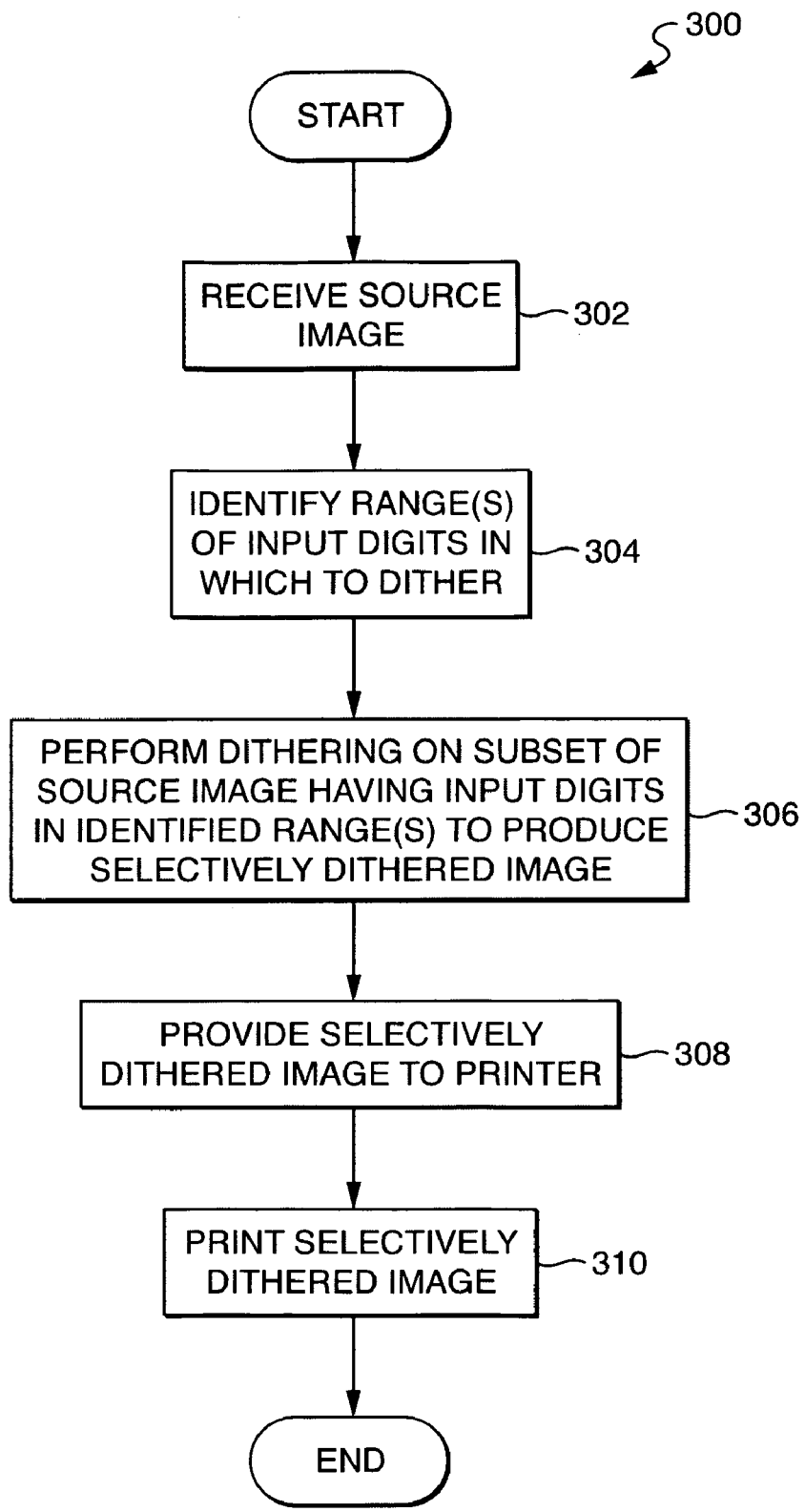
FIG. 3A is a flowchart of a method for selectively dithering a source image according to one embodiment of the present invention.
Figure 4A:
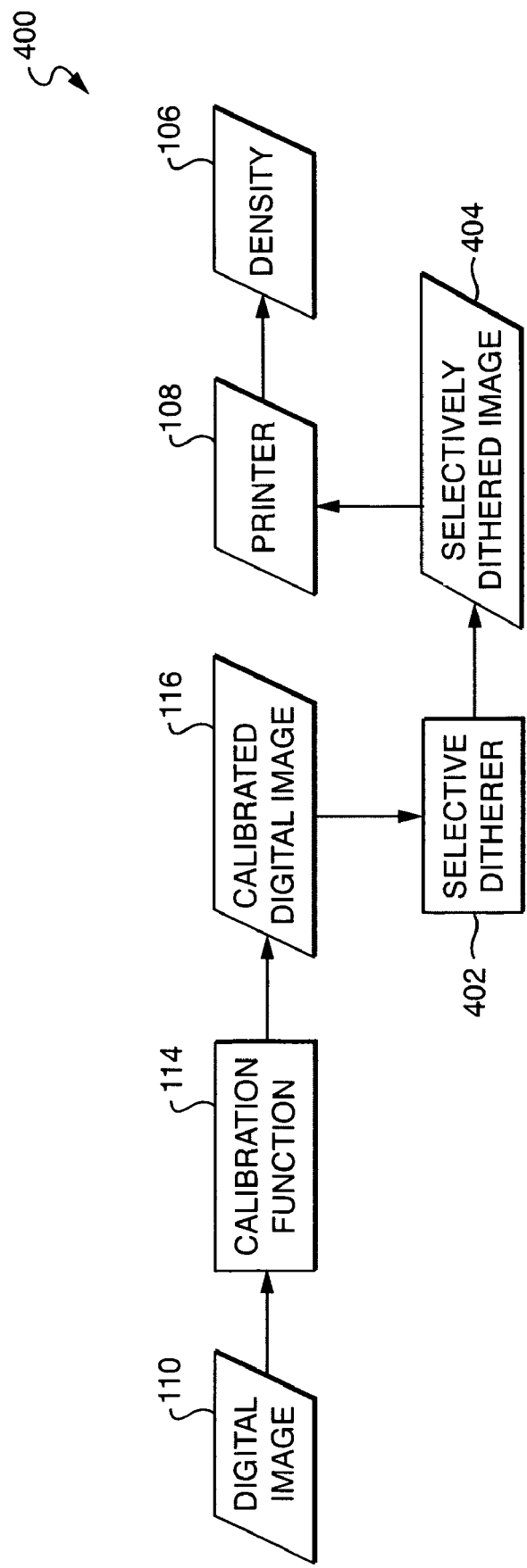
FIG. 4A is a functional block diagram of a system for performing the method of FIG. 3A according to one embodiment of the present invention.

Embodiments of the present invention will now be described in more detail. Referring to FIG. 3A, a flowchart is shown of a method 300 for selectively dithering a source image according to one embodiment of the present invention. Referring to FIG. 4A, a functional block diagram is shown of a system 400 for performing the method 300 according to one embodiment of the present invention. The method 300 may, for example, be performed in hardware, software, or firmware within a printer.

The system 400 includes the calibration function 114, which may, as described above, produce calibrated digital image 116 based on digital image 110. The system 400 also includes a selective ditherer 402. The selective ditherer 402 receives a source image, such as the calibrated digital image 116 (step 302). The source image may, for example, be a color image having red, green, and blue (RGB) color planes. Although certain techniques may be described herein as being applied to an entire source image or other image, such techniques may be applied separately to the R, G, and B color planes of such images.

The selective ditherer 402 identifies one or more ranges of input digits for which to perform dithering (step 304). The range(s) of input digits may be selected in any of a variety of ways, examples of which are described below with respect to FIGS. 3B and 4C.

The selective ditherer 402 performs dithering on that subset of the source image having input digits within the identified range(s), to produce a selectively dithered image 404 (step 306). The selective ditherer 402 leaves unchanged that subset of the source image having input digits not within the identified range(s). The selective ditherer 402 provides the selectively dithered image 404 to the printer 108 (step 308), which prints the selectively dithered image 404 in the form of output densities 106 (step 310).

Figure 3B:
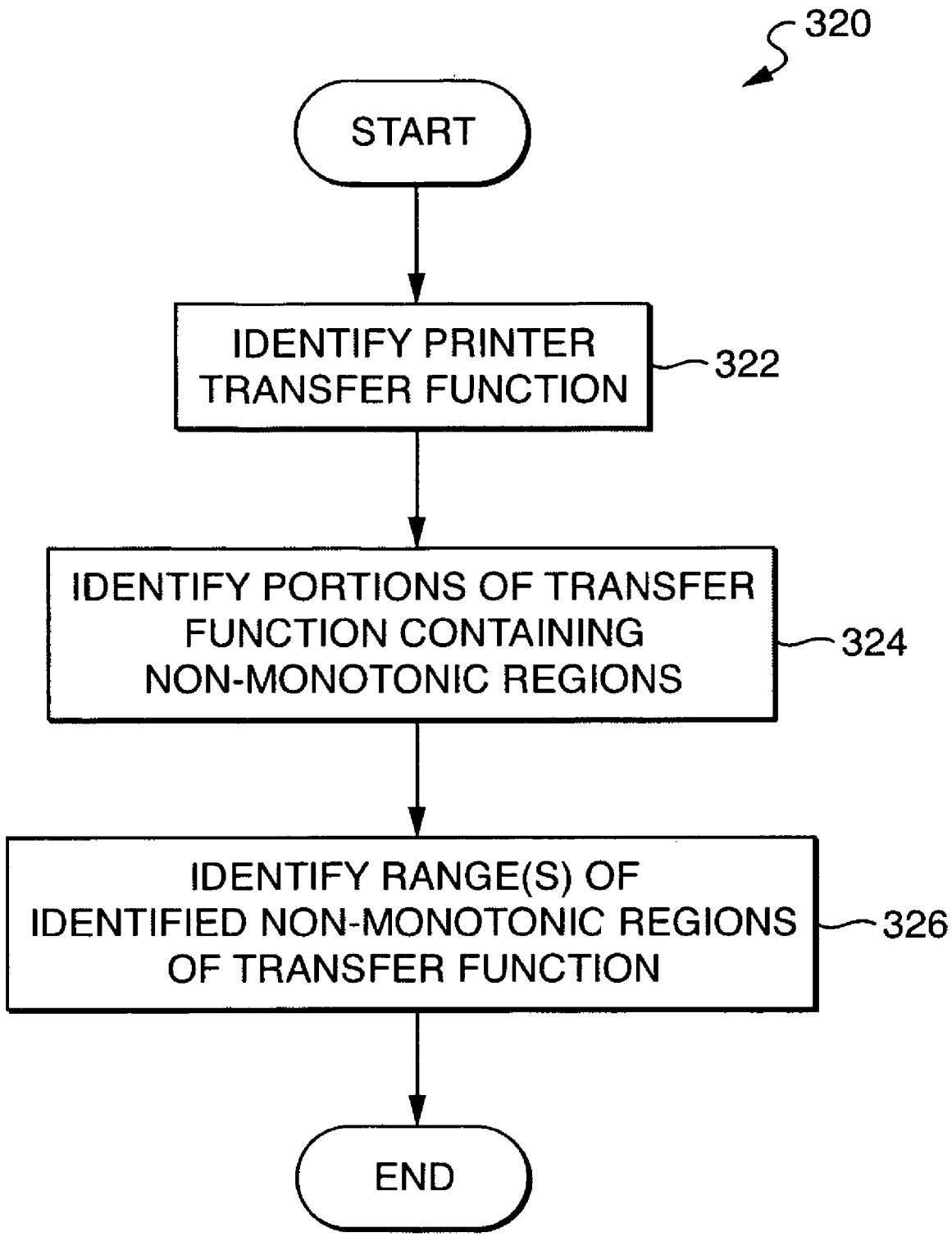
FIG. 3B is a flowchart of a method that is used in one embodiment of the present invention to select a range of digits to dither in a digital image.
Figure 4B:
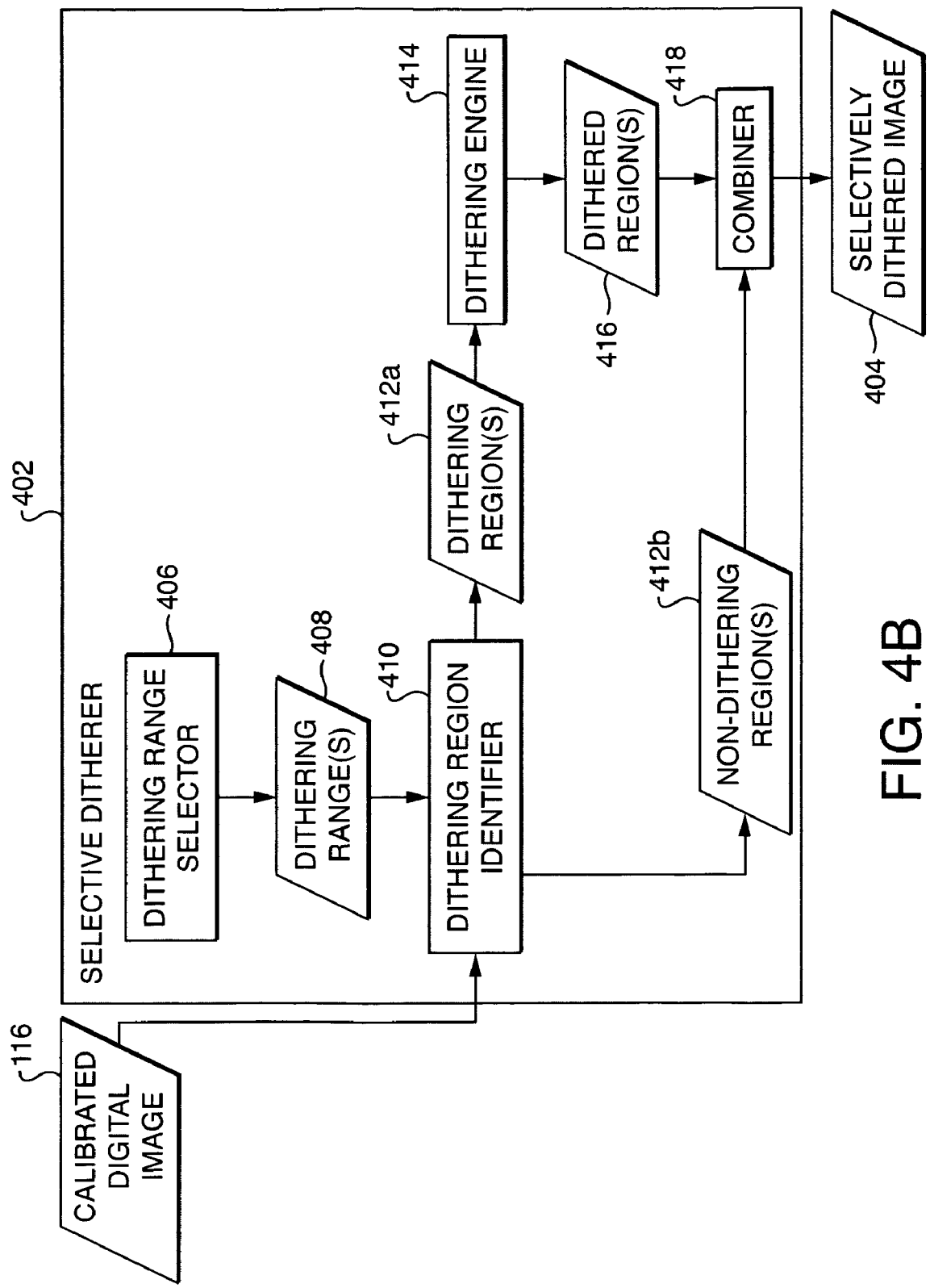
FIG. 4B is a functional block diagram of a device for performing selective dithering according to one embodiment of the present invention.

Referring to FIG. 4B, a functional block diagram is shown illustrating the selective ditherer 402 in more detail according to one embodiment of the present invention. The selective ditherer 402 includes a dithering range selector 406 which selects one or more ranges 408 of input digits for which to perform dithering (FIG. 3A, step 304). Examples of techniques that may be used to perform step 304 will be described below with respect to FIGS. 3B and 4C.

The selective ditherer 402 also includes a dithering region identifier 410, which uses the dithering range(s) 408 to identify one or more regions 412a of the calibrated digital image 116 in which to perform dithering. In particular, the dithering region identifier 410 identifies the dithering region(s) 412a as the region(s) of the calibrated digital image 116 having digits within the dithering range(s) 408. The dithering region identifier 410 identifies the remainder of the calibrated digital image 116 as a non-dithering region 412b.

The selective ditherer 402 includes a dithering engine 414 which performs dithering on the dithering region 412a of the calibrated digital image 116, thereby producing one or more dithered regions 416. A combiner 418 (e.g., an adder) combines the dithered region 416 with the non-dithered region 412b to produce the selectively dithered image 404. The selective ditherer 402 thereby performs dithering only on the region(s) of the calibrated digital image 116 having digits within the selected dithering range(s) 408.

Note that because there may be no overlap between the dithered regions 416 and the non-dithering regions 412b, the combiner 418 may not need to add or otherwise combine any pixels in the dithered regions 416 with pixels in the non-dithering regions 412b. Rather, the combiner 418 may simply act as a switch to select a pixel from either the dithered regions 416 or the non-dithering regions 412b for each pixel location in the selectively dithered image 404.

Figure 1A:
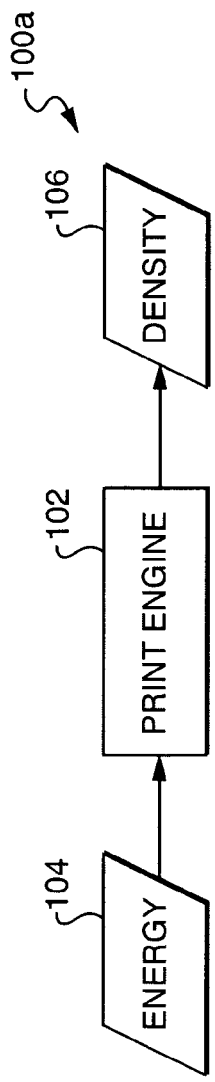
FIG. 1A is a functional block diagram of a prior art print system.
Figure 1B:
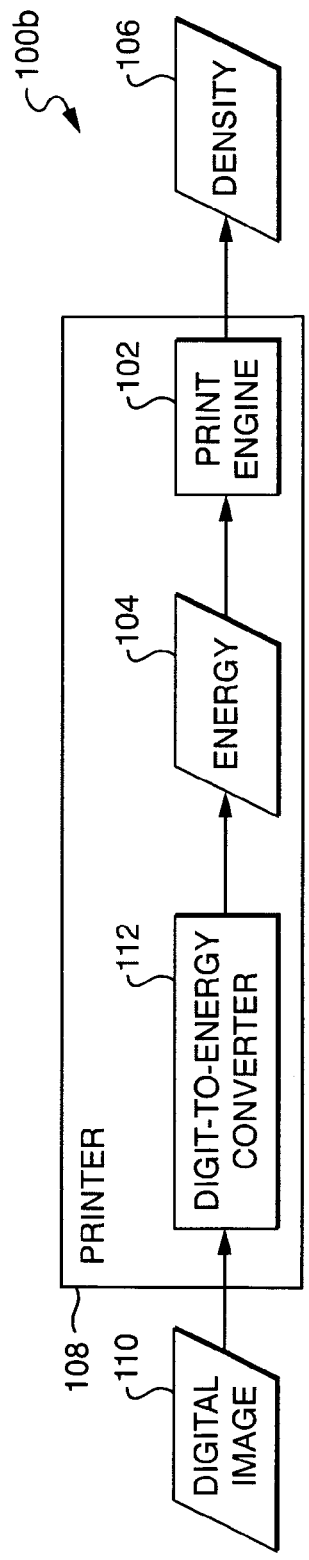
FIG. 1B is a functional block diagram of a prior art system for printing a digital image.
Figure 1C:
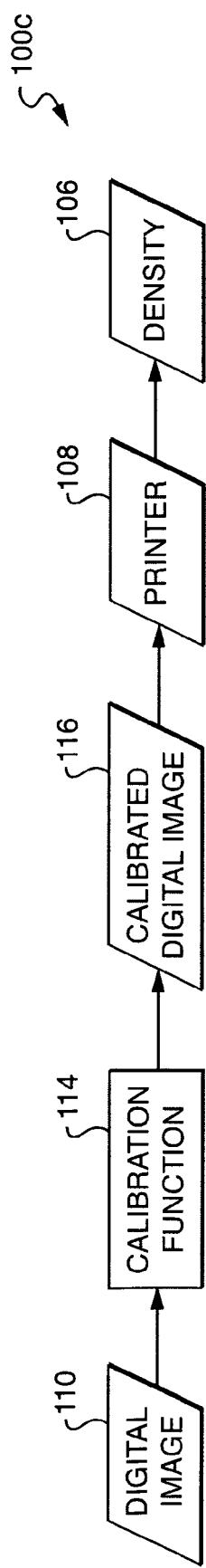
FIG. 1C a functional block diagram of a prior art printing system including a calibration function to compensate for printer imperfections.
Figure 2:
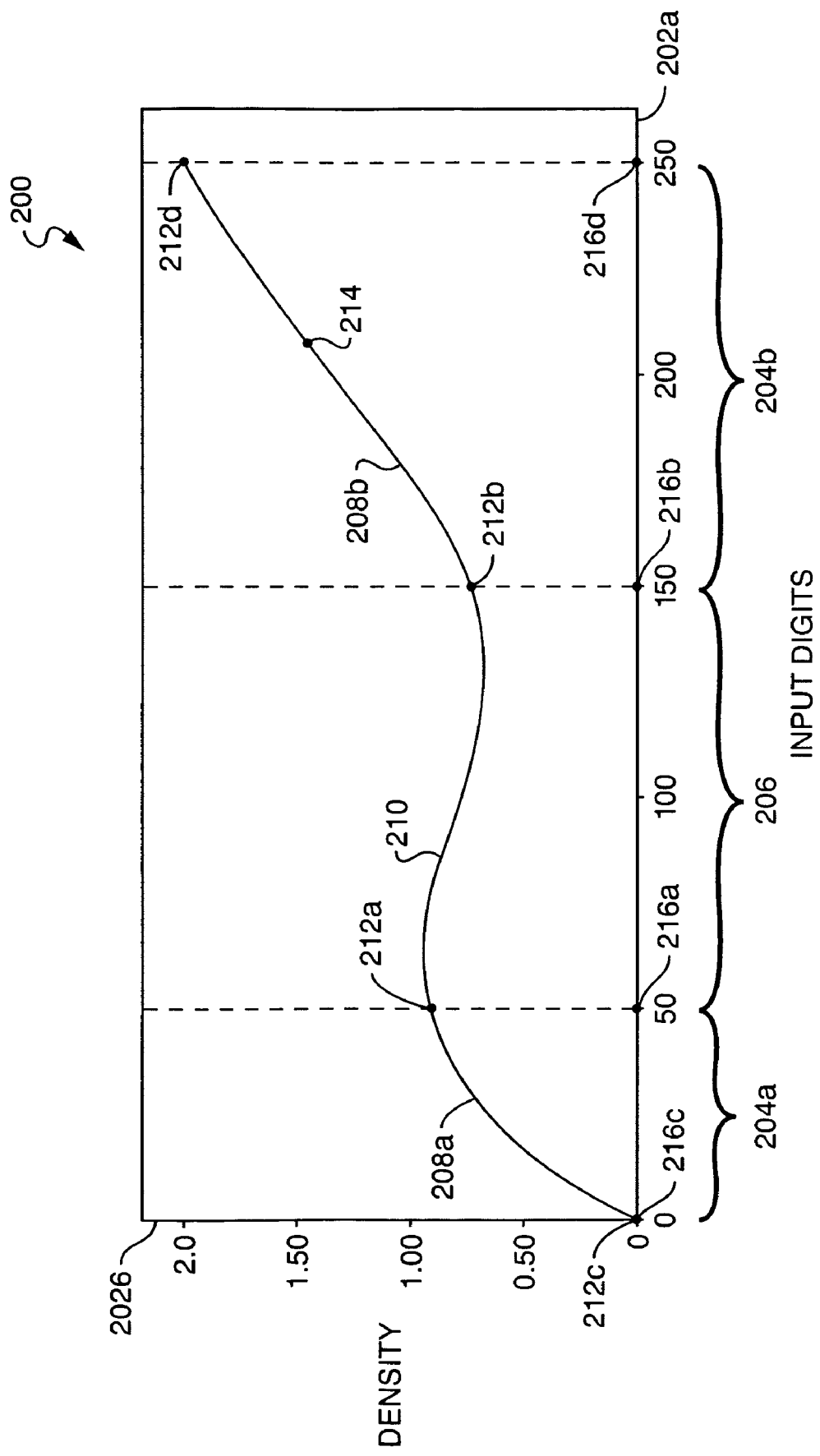
FIG. 2 is a graph of a transfer function according to one embodiment of the present invention.

For clarity of explanation, embodiments of the present invention will be described with respect to an example transfer function of the printer 108. Referring to FIG. 2, a graph of such a transfer function 200 is shown.

The graph plots input digits on axis 202a versus output density on axis 202b. As mentioned above, it is desirable that the transfer function of a printer be monotonic. The particular transfer function 200 illustrated in FIG. 2, however, is not monotonic. In particular, transfer function 200 includes regions 208a-b and 210. Regions 208a-b are monotonic, while region 210 is not monotonic. Monotonic regions 208a-b have ranges 204a-b, respectively, while non-monotonic region 210 has range 206.

Note that the example graph shown in FIG. 2 assumes that increasing digits should correspond to increasing densities. Although this assumption may be correct in some cases, it may be incorrect in others. For example, increasing RGB digits correspond to decreasing densities. In general, it is desirable that the printer transfer function be monotonic, whether increasing monotonic or decreasing monotonic.

Figure 4C:
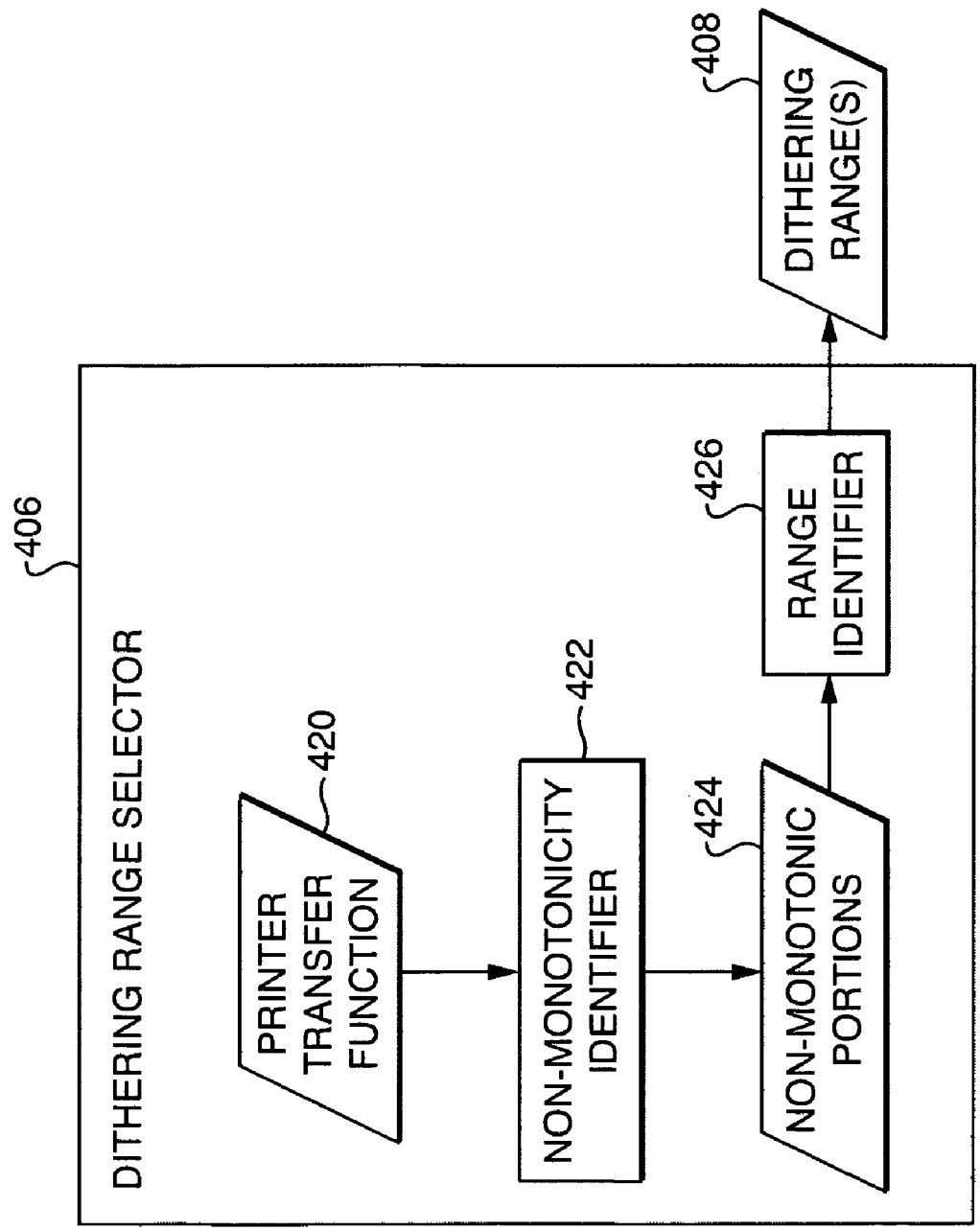
FIG. 4C is a functional block diagram of a system for performing the method of FIG. 3B according to one embodiment of the present invention.

In one embodiment of the present invention, the selective ditherer 402 dithers only region(s) of the calibrated digital image 116 having digits falling within non-monotonic portions of the printer transfer function. Referring to FIG. 3B, a flowchart is shown of a method 320 that is used in one embodiment of the present invention by the dithering range selector 406 (FIG. 4B) to select the dithering range(s) 408. Referring to FIG. 4C, a dataflow diagram is shown of the dithering range selector 406 in one embodiment of the present invention for performing the method 320 of FIG. 3B. The method 320 may, for example, be performed in hardware, software, or firmware within a printer.

The method 320 identifies a transfer function 420 of the printer that is to print a source image, such as the calibrated digital image (step 322). The transfer function 420 may be identified in any of a variety of ways. For example, it may be identified through empirical testing by probing the printer 108 with input digits and measuring the output densities produced in response thereto. The transfer function 420 may also be identified using other techniques, such as by simulating the operation of the printer 108.

A non-monotonicity identifier 422 identifies portions 424 of the transfer function 420 that contain non-monotonic regions (step 324). For example, referring again to FIG. 2, transfer function 200 includes non-monotonic portion 210. Such portions may be identified by using well-known techniques to identify a starting point and end point of each portion. For example, portion 210 has starting point 212a (having x coordinate 216a) and end point 212b (having x coordinate 216b).

The dithering range selector 406 includes a range identifier 426 which identifies the dithering range(s) 408 of the identified non-monotonic portions 424 of the transfer function 420 (step 326). Portion 210 of transfer function 200, for example, has range 206.

Note that any of a variety of starting points and end points may be chosen for non-monotonic portions of the transfer function 420. For example, referring again to FIG. 2, point 214 may be chosen as the end point of non-monotonic portion 210, rather than point 212b.

More generally, let f be the transfer function and let (a,b) be the range of input digits for which dithering is performed (the "dithering range"). The dithering range should be chosen such that f(b)>f(a), and such that f is nonmonotonic in the range (a,b). Furthermore, the upper limit for point a is the local maximum of function f, and the lower limit for point b is the local minimum of function f. Within these constraints, any values may be chosen for digits a and b.

In general, the pair of x coordinates a and b (such as coordinates 216a and 216b in FIG. 2) for a portion of the transfer function 420 in which dithering is to be performed is referred to herein as a pair of "anchor points." Although in the example described with respect to FIGS. 3B and 4C, anchor points are chosen based on identified non-monotonocities in the transfer function 420, this is not a requirement of the present invention. Rather, anchor points may be chosen in any manner. Choosing anchor points that are fixed points of the printer 108, however, may provide particularly stable results. A "fixed point" refers to an input energy that produces a relatively constant output density over time. Another consideration to take into account when choosing anchor points is that spatial resolution decreases as the output range (f(b)−f(a) for anchor points a and b) of a dithered region increases. As a result, it is desirable to minimize the output range of each dithered region by selecting anchor points a and b that are as close together as possible.

The selective ditherer 402 may then use the techniques disclosed above with respect to FIGS. 3A and 4A-4B to perform dithering on that subset of the calibrated digital image 116 having digits within the range(s) 408 of the non-monotonic portion(s) 424 identified in step 324, thereby producing the selectively dithered image 404 (FIG. 3A, step 306). As described above, the selective ditherer 402 leaves unchanged that subset of the calibrated digital image 116 having digits within the remainder of the printer transfer function 420. For example, if the printer transfer function 420 were the transfer function 200 illustrated in FIG. 2, the ditherer 402 would perform dithering only on those pixels in the image 116 having digits (e.g., R, G, or B values) within the range 206 (i.e., between anchor points 216a and 216b), which define non-monotonic region 210.

As further described above, the dithered image 404 may then be provided to the printer 108 (FIG. 3A, step 308), which produces the printed densities 106 representing the digital image 110 (FIG. 3A, step 310). The use of dithering within the non-monotonic portions 424 of the calibrated digital image 116 avoids the production of undesirable visual artifacts in the printed densities 106 that would result if dithering had not been applied. Note that although the method 300 provides the dithered image 404 directly to the printer 108, further processing (such as thermal history control and tonescale management) may be performed on the dithered image 404 before providing it to the printer 108.

Note that although FIGS. 3B and 4C illustrate examples of techniques that may be used to select the dithering ranges 408 based on non-monotonicities in the transfer function 420, this is merely an example of a way in which the dithering range(s) 408 may be selected, and does not constitute a limitation of the present invention. Rather, the dithering range(s) 408 may be selected in any of a variety of ways. For example, in one embodiment of the present invention, the dithering range(s) 408 is/are selected as ranges of the transfer function which produce unreliable output and therefore which would likely produce grain in the printed output if not dithered. Typically, such regions occur in the low and high ends of the digit range. For example, if the full digit range is 0-255, grain-producing ranges may include the ranges 0-5 and 250-255. Particular ranges which produce grain, however, may be identified in each case based on empirical testing or using other techniques.

Figure 6:
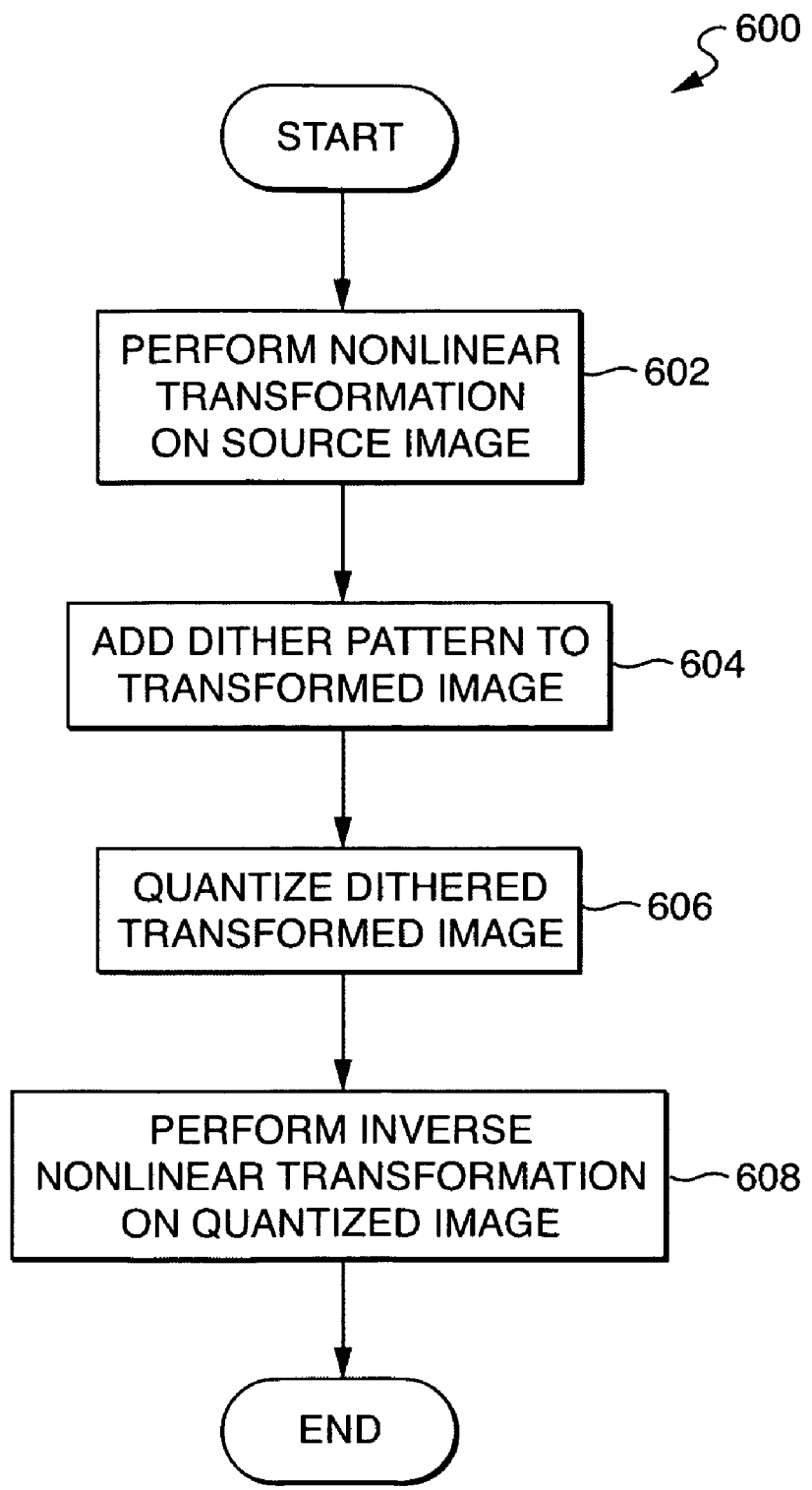
FIG. 6 is a flowchart of a method that is performed by a ditherer to selectively dither an image according to one embodiment of the present invention.
Figure 7:
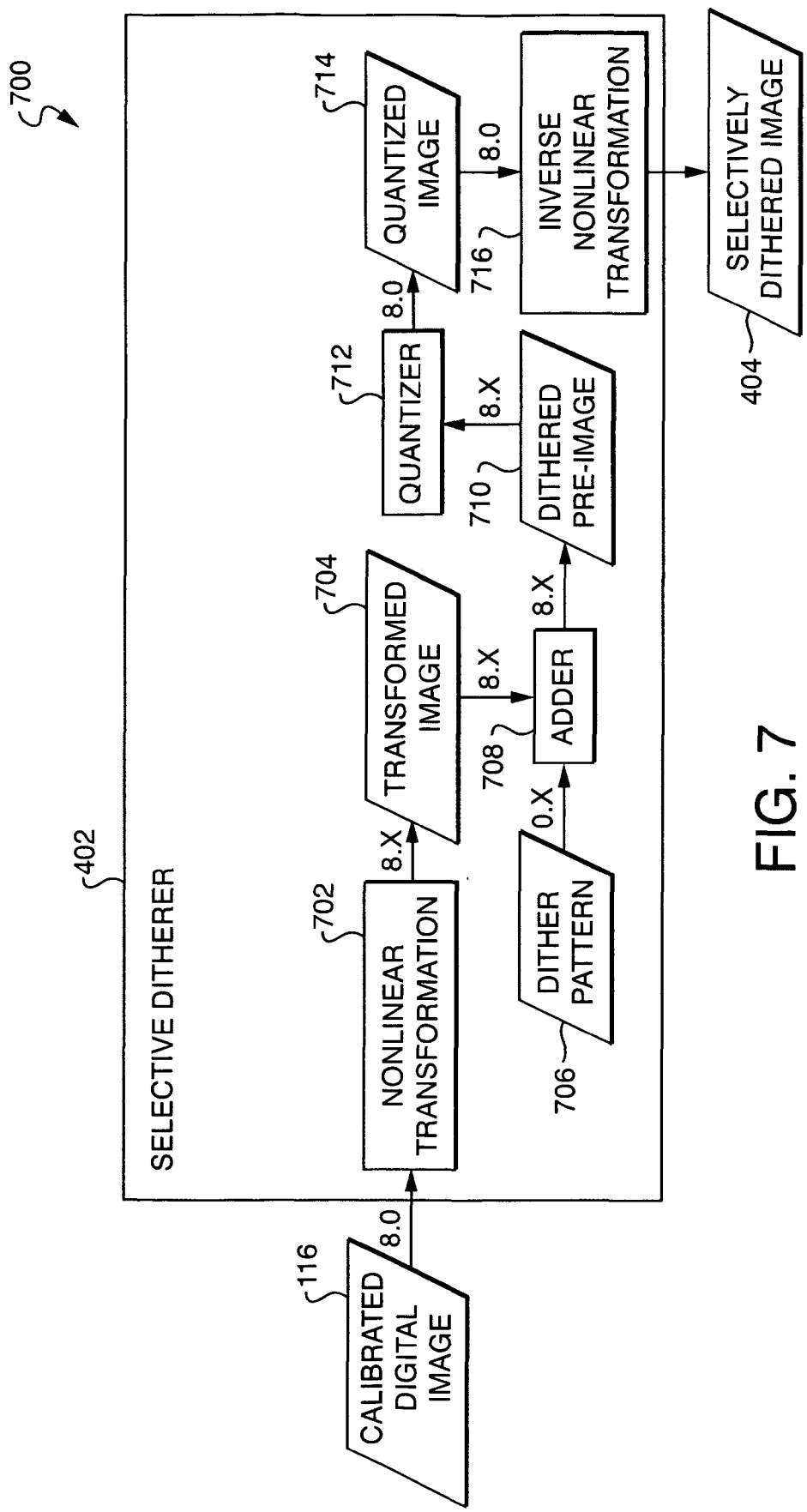
FIG. 7 is a functional block diagram of a ditherer that performs the method of FIG. 6 according to one embodiment of the present invention.

Examples of techniques that may be used to perform dithering on the dithering region(s) 412a of the calibrated digital image 116 (FIG. 3A, step 306) will now be described in more detail. Referring to FIG. 6, a flowchart is shown of a method 600 that is performed by the ditherer 402 in one embodiment of the present invention to perform step 306. Referring to FIG. 7, a functional block diagram is shown of the ditherer 402 according to one embodiment of the present invention, as configured and arranged to perform the method 600. The method 600 may be performed separately on each RGB plane of the calibrated digital image 116.

Figure 5A:
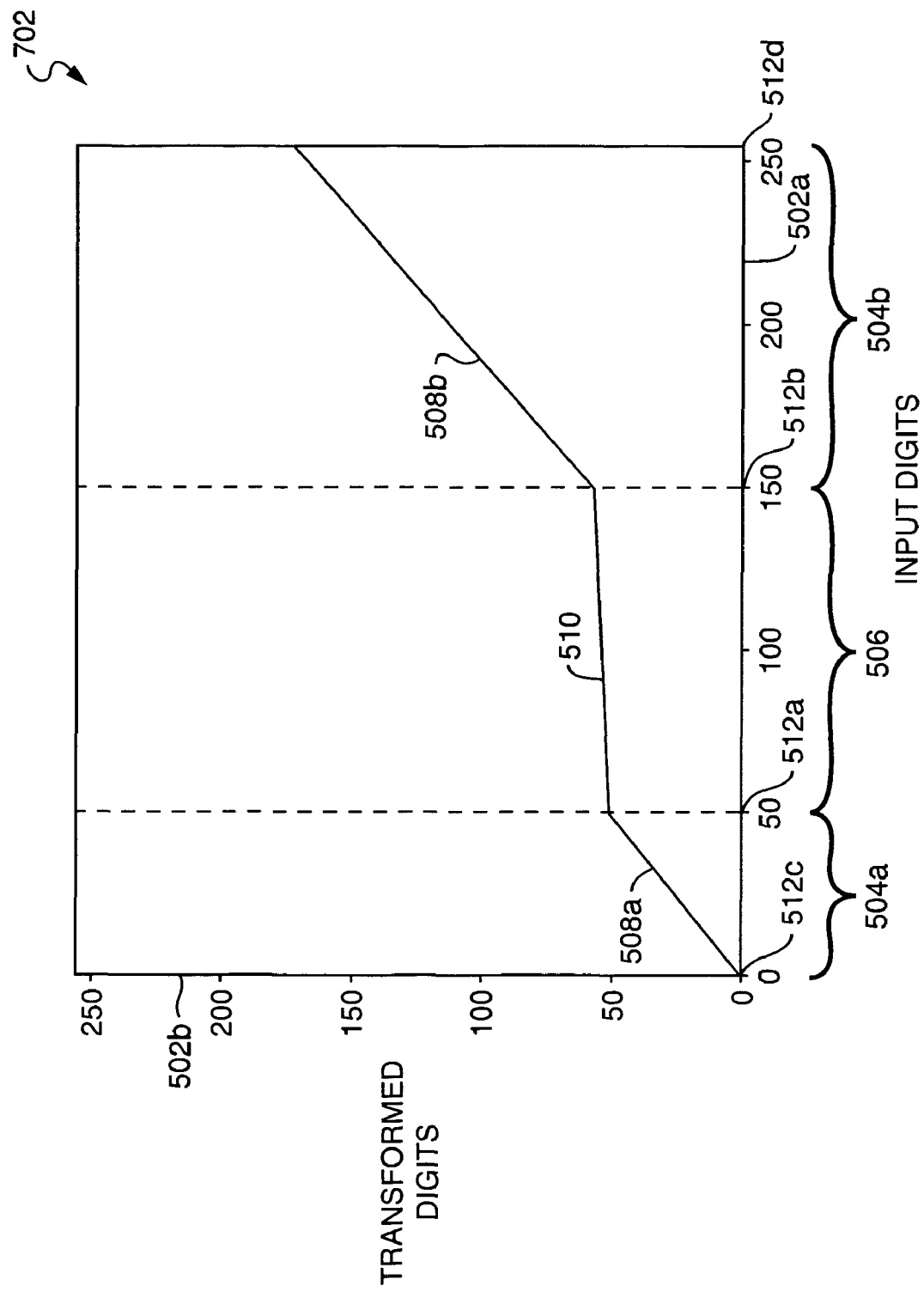
FIG. 5A is a graph of a non-linear transformation according to one embodiment of the present invention.

The ditherer 402 applies a nonlinear transformation 702 to the calibrated digital image 116, thereby producing a transformed image 704 (step 602). Referring to FIG. 5A, a graph is shown illustrating the non-linear transformation 702 according to one embodiment of the present invention. The graph plots input digits on axis 502a against output digits on axis 502b.

Note that transformation 702 is monotonic in the embodiment illustrated in FIG. 5A. Furthermore, the transformation 702 includes portions 508a-b and 510, having ranges 504a-b and 506, respectively. The range 506 of portion 510 (defined by anchor points 512a-b) may be selected to be the same as the range 408 of the dithering region 412a identified by the dithering region identifier 410 (FIG. 4B), while the ranges 504a-b of portions 508a-b may be selected to be the same as the range of non-dithering region(s) 412b identified by the dithering region identifier 410 (FIG. 4B).

In the transformation 702 illustrated in FIG. 5A, the portions 508a-b of transformation 702 are selected to have a slope of one, while the portion 510 is chosen to have a slope that is less than one. In summary, in one embodiment of the present invention, the non-linear transformation 702 is a piecewise linear transformation that is: (1) monotonic, (2) linear with a slope of less than one in the dithering range(s) 408 of input digits, and (3) linear with a slope of one in the remaining range(s) of input digits. Note that although these three criteria specify a piecewise linear function, this is not a requirement of the present invention. More generally, the non-linear transformation 702 may be chosen as any function satisfying the following constraints: (1) the function is monotonic; (2) the anchor points are fixed; (3) in each of the dithering regions, the range of y values is less than the difference between the anchor points; and (4) in each of the non-dithering regions, the function is linear with a slope of one.

Furthermore, note that once a function satisfying these criteria is generated, it may be combined with the calibration function 114. In one embodiment of the present invention, calibration is performed in part by the calibration function 114 and in part by the digit-to-energy converter 112. In particular, the calibration function 114 is used to calibrate digits in the dithering region(s) 412a of the original digital image 110, and the digit-to-energy converter 112 is used to calibrate digits in the non-dithering regions 412b of the selectively dithered image 404 produced by the selective ditherer 402. This division of labor between the calibration function 114 and digit-to-energy converter 112 is chosen because: (1) the digits in the dithering region(s) 412a are eliminated by the process of dithering (FIG. 4B) and therefore are not available in the selectively dithered image 404 for calibration by the digit-to-energy converter 112; and (2) the remaining digits (in the non-dithering region(s) 412b) are preferably calibrated by the digit-to-energy converter 112 because in one embodiment the digit-to-energy converter 112 produces output having a higher precision (e.g., 16 bits) than that produced by the calibration function 114 (e.g., 8 bits).

The particular transfer function 702 shown in FIG. 5A, however, is merely an example and does not constitute a limitation of the present invention. For example, the non-linear transformation 702 need not be linear in the remaining (non-dithering) ranges of input digits. Furthermore, the non-linear transformation 702 need not have a slope of one outside of the dithering range(s) 408, since the non-linear transformation 702 may be combined with the calibration function 114 to achieve the same result.

Figure 8:
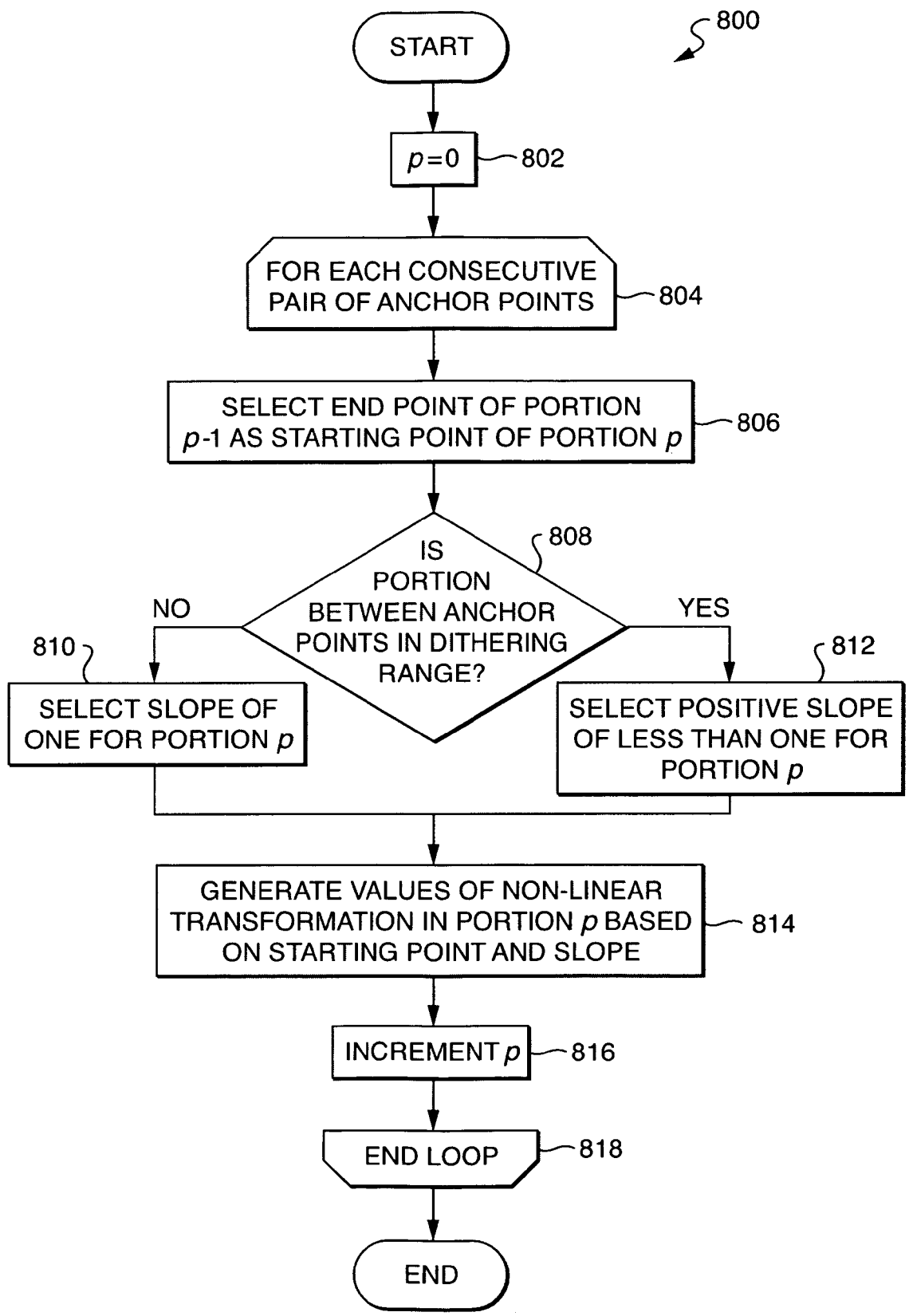
FIG. 8 is a flowchart of a method for generating a non-linear transformation for use in the method of FIG. 6 according to one embodiment of the present invention.

Referring to FIG. 8, a flowchart is shown of a method 800 for generating the nonlinear transformation 702 according to one embodiment of the present invention. The method 800 may, for example, be performed by the ditherer 402 prior to performing step 602 of method 600.

The method 800 initializes a variable p, which identifies the portion of the nonlinear transformation 702 that is being generated by the method 800, to a value of zero (step 802). The method 800 enters a loop over each consecutive pair of anchor points (step 804). For purposes of method 800, the x coordinate 216c of the origin 212c and x coordinate 216d of the end point 212d of the transfer function 420 are considered to be anchor points. In the transfer function 200 illustrated in FIG. 2, points 216c and 216a are the first consecutive pair of anchor points, points 216a and 216b are the second consecutive pair of anchor points, and points 216b and 216d are the third consecutive pair of anchor points.

The method 800 selects the end point of the previous portion p−1 as the starting point of portion p in the nonlinear transformation 702 (step 806). For example, the starting point 512a of portion 510 in linear transformation 702 (FIG. 5A) is the same as end point 512a of the previous portion 508a. The starting point of the first portion in the nonlinear transformation 702 (e.g., portion 508a in FIG. 5A) may be selected as the point having coordinates (0,0).

The method 800 determines whether the range of digits between the current set of anchor points is one of the dithering ranges 408 (step 808). In the example illustrated in FIG. 5A, the range 504a of portion 508a is not one of the dithering ranges 408, while the range 506 of portion 510 is one of the dithering ranges 408.

If the range of digits between the current set of anchor points is not one of the dithering ranges 408, the method 800 selects the slope of portion p to be equal to one (step 810). For example, portion 508a of nonlinear transformation 702 has a slope of one.

If the range of digits between the current set of anchor points is one of the dithering ranges 408, the method 800 selects the slope of portion p to be a positive value that is less than one (step 812). For example, portion 510 of nonlinear transformation 702 has a positive slope that is less than one.

Let $D_1$ and $D_2$ be the current pair of anchor points. In one embodiment of the present invention, the method 800 selects a slope of $1/(D_2-D_1)$ for portion p in step 812. As a result, the transform will have a y-span of 1 between x coordinates $D_1$ and $D_2$.

The method 800 generates values of the nonlinear transformation 702 in portion p based on the starting point selected in step 806 and the slope selected in step 810 or 812 (step 814). Assuming again that $D_1$ and $D_2$ are the current pair of anchor points, the method 800 may, for example, generate the non-linear transformation values in step 814 by generating a line segment starting at the selected starting point, having the selected slope, and ending at x coordinate $D_2$.

The method 800 increments the value of p (step 816) and repeats steps 804-816 for the remaining sets of consecutive anchor points in the transfer function 420 (step 818). The result is a nonlinear transformation, such as the nonlinear transformation 702 illustrated in FIG. 5A. Inverse transformation 716 may be generated straightforwardly from the nonlinear transformation 702 using techniques that are well-known to those of ordinary skill in the art. The nonlinear transformation 702 and inverse nonlinear transformation 716 may be implemented in any manner, such as in lookup tables implemented in hardware, software, or firmware.

In the embodiment illustrated in FIG. 7, the source image 402 is an 8-bit image. The notation "8.0" on a signal in FIG.

7 indicates that the signal is exactly eight bit wide and contains eight bits for the integer part and no fractional bits. In the embodiment illustrated in FIG. 7, the transformed image 704 produced by the nonlinear transformation 702 contains eight bits for the integer part plus some number (e.g., 8) of fractional bits. In other words, the nonlinear transformation 702 may transform its input (e.g., the source image 402) from an 8-bit color space to a 16-bit color space.

In particular, the nonlinear transformation 702 illustrated in FIG. 5A maps input digits in portion 510 into transformed real-number values falling between two consecutive integers. For example, the nonlinear transformation 702 maps input digits in portion 510 to real-number values ranging between 50.0 and 51.0.

An adder 708 adds a dither pattern 706 to the transformed image 704, thereby producing a dithered pre-image 710 (step 604). In the embodiment illustrated in FIG. 7, the dither pattern 706 consists solely of some number (e.g., 8) of fractional bits (i.e., bits representing a number between 0 and 1). Various dither patterns are well-known to those of ordinary skill in the art, and any dither pattern may be used as the dither pattern 706. In general, however, dither patterns are intended to represent noise. The dithered pre-image 710 produced by adding the dither pattern 706 to the transformed image 704 includes both bits for the integer part and fractional bits.

Recall that the nonlinear transformation 702 has purely integer values in portions 508a-b. As a result, adding the purely fractional dither pattern 706 to integer values in the transformed image 704 in portions 508a-b produces the same integer values with added fractional parts. For example, adding a fraction (such as 0.25) to a pure integer (such as 10) will produce the same integer (10) plus the fraction (0.25), namely 10.25.

Recall further that the values of the nonlinear transformation 702 in portion 510 include both integer and fractional parts. As a result, adding the purely fractional dither pattern 706 to a value in portion 510 having both an integer part and a fractional part may produce either: (1) the same integer plus a fraction; or (2) the next highest integer plus a fraction. For example, adding 0.25 to 10.3 will produce the same integer (10) plus a fraction (0.55), while adding the same fraction to 10.8 will produce the next highest integer (11) plus a fraction (0.05).

A quantizer 712 quantizes the dithered pre-image 710 by stripping the fractional bits from it (step 606), thereby producing a quantized image 714 that contains eight bits for the integer part and no fractional bits. Stripping the fractional bits from transformed digits in portions 508a-b will restore them to the values they had in the transformed image 704. In other words, the combined operations performed by the adder 708 and the quantizer 712 have no net effect on the transformed digits in portions 508a-b. This is because such digits begin with purely integer values. The result of adding purely fractional values to such digits and then stripping the fractional values from such digits is to restore the original integer values in the transformed digit space.

The combined effect of the adder 708 and quantizer 712 on transformed digits in portion 510, however, is to provide each such transformed digit with the transformed value of one of the anchor points of the portion containing the transformed digit. For example, each transformed digit in the quantized image 714 that was produced using portion 510 of the transformation 702 will have a value of either 50 or 51. This may be appreciated by recognizing that adding the purely fractional dither pattern 706 to transformed digits in portion 510 of the transformation 702 produces transformed digits that are equal to: (1) 25 plus a fractional part; or (2) 26 plus a fractional part. Stripping the fractional parts from these resulting values produces transformed digits that are equal either to 25 or to 26. The closer a digit in the original image is to the x-coordinate of an anchor point, the more frequently that anchor point will appear in the quantized image 714.

Figure 5B:
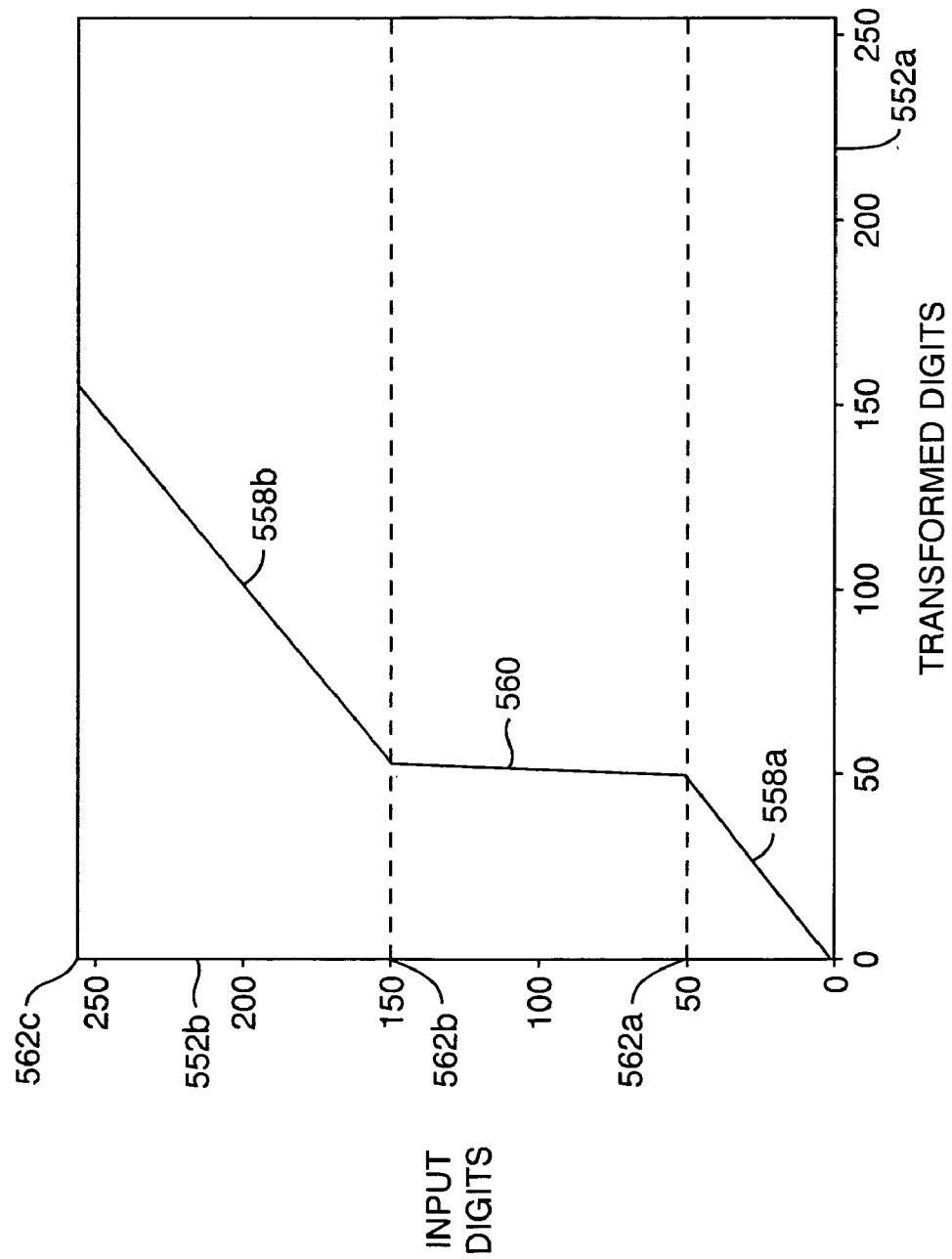
FIG. 5B is a graph of the inverse of the non-linear transformation of FIG. 5A according to one embodiment of the present invention.

The ditherer 402 applies the inverse 716 of the nonlinear transformation 702 to the quantized image 714, thereby producing the dithered image 404 first described above with respect to FIG. 4A (step 608). Referring to FIG. 5B, a graph is shown illustrating a transformation 716 that is used as the inverse non-linear transformation 716 in one embodiment of the present invention. The graph plots transformed digits on axis 552a versus input digits on axis 552b.

The inverse transformation 716 includes portions 558a-b, which correspond to portions 508a-b in the forward transformation 702 (FIG. 5A). Furthermore, the inverse transformation 716 includes portion 560, which corresponds to portion 510 in the transfer function 702. Anchor points 562a-c define the boundaries of portions 558a-b and 560. Note that the inverse transformation 716 maps all transformed digits to purely integral input digits. The resulting dithered image 404 may therefore be represented in an 8-bit (purely integral) space.

Further note that the effect of applying the inverse transformation 716 in portions 558a-b is to restore the original digit values within any regions of the dithered image 404 that were produced by applying portions 508a-b (FIG. 5A) of the transformation 702, and to produce dithered values within any regions of the dithered image 404 that were produced by applying portion 510 of the transformation 702. The method 600 shown in FIG. 6 and the ditherer 402 shown in FIG. 7, therefore, produce the effect of performing dithering only within that subset of the source image (e.g., the calibrated digital image 116) having digits that are within the dithering range(s) 408 of the printer transfer function 420.

One advantage of techniques disclosed herein is that they provide means for selectively dithering only a subset of a digital image. Such selective dithering may be desirable for any of a variety of reasons. For example, it may be desirable to dither those image regions having digits falling within non-monotonic regions of the printer transfer function. As another example, it may be desirable to dither those image regions having digits for which the printer transfer function is indeterminate. Although dithering may advantageously eliminate or reduce the undesirable effects of transfer function non-monotonicity and indeterminacy, dithering also has some disadvantages, such as decreasing image resolution. By dithering only in selected regions of the image, the advantages of dithering may be obtained in those selected regions of the image where the advantages of dithering outweigh its disadvantages, while retaining the benefits of the inherent printer transfer function (such as high resolution) in the remainder of the image.

Another advantage of techniques disclosed herein is that if the anchor points (i.e., endpoints) of the non-monotonic portions 424 of the printer transfer function 420 are chosen to be monotonic, then the resulting tonescale will be monotonic by construction. This avoids the various problems, described above, which are caused by non-monotonic tonescales.

Another advantage of techniques disclosed herein is that they may be implemented and performed more efficiently than techniques which apply dithering to portions of images selected on the basis of their contents, rather than on the basis of the printer transfer function 420. Techniques that require analysis of image content may require significant processing power and time to perform. The techniques disclosed herein, in contrast, select regions of an image to dither based on the printer transfer function 420, which may be analyzed relatively simply in accordance with the preceding discussion.

Furthermore, once particular regions of the transfer function 420 are selected for dithering, dithering may effectively be performed only on the appropriate regions of the source image 402 even though the dither pattern 706 is added to the entire image. The process of applying the nonlinear transformation 702 to the source image 402, quantizing the dithered pre-image 710, and then applying the inverse nonlinear transformation 716 to the quantized image 714, causes the effect of dithering to remain only in those regions of the source image 402 having digits falling within the non-monotonic portions 424 of the transfer function 420. In other words, the effect of selective dithering is achieved even though the dither pattern 706 is applied to the entire transformed image 704. As a result, the techniques disclosed herein may perform selective dithering more simply and efficiently than techniques which attempt to perform selective dithering by adding the dither pattern 706 to regions of the source image 402 based on the content of those regions. Note, however, that the techniques disclosed herein may be applied in conjunction with such alternative forms of selective dithering and with other image processing techniques.

As described above, in one embodiment of the present invention, calibration is performed in part by the calibration function 114 and in part by the digit-to-energy converter 112. The calibration function 114 is used to dither digits in the dithering region(s) 412a, which are eliminated by the process of dithering (FIG. 4B) and therefore are not available in the selectively dithered image 404 for calibration by the digit-to-energy converter 112. It is therefore advantageous to use the calibration function 114 to dither these digits. It is advantageous to use the digit-to-energy converter 112 to dither the remaining digits (in the non-dithering region(s) 412b) because in one embodiment the digit-to-energy converter 112 produces output having a higher precision (e.g., 16 bits) than that produced by the calibration function 114 (e.g., 8 bits).

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may further be divided into additional components or joined together to form fewer components for performing the same functions.

The particular transfer function 200 illustrated in FIG. 2 is shown and described merely as an example. Techniques disclosed herein may be used in conjunction with this or other transfer functions. Furthermore, the term "printer transfer function" may refer to the transfer function of the entire printer 108 or to any subcomponent(s) thereof, such as the print engine 102. The particular anchor points (212a-d) illustrated in FIG. 2 are shown merely for purposes of example. Other anchor points may be used in conjunction with the transfer function 200 or other transfer functions.

Although certain techniques are described herein as being applied to the calibrated digital image 116, the techniques disclosed herein may be applied to any digital image. Any kind of processing may be applied to an image before applying the techniques disclosed herein, and any kind of processing may be applied to an image after applying the techniques disclosed herein.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method of processing a digital image tangibly stored on a first computer-readable medium, the method performed by a computer processor executing computer program instructions tangibly stored on a second computer-readable medium, the method comprising:

(A) identifying at least one non-monotonic portion of a transfer function of a printer, the transfer function relating input digits to output density, the at least one portion having at least one range of digital values which is less than the full range of digital values; and (B) dithering only that subset of the digital image having digits within the at least one range of digital values to produce a dithered image tangibly stored on a third computer-readable medium, wherein the step (B) comprises:

applying a nonlinear transformation to the digital image to produce a transformed image;

selectively adding a dither pattern to the transformed image to produce a dithered pre-image;

quantizing the dithered pre-image to produce a quantized image; and applying an inverse of the nonlinear transformation to the image to produce the dithered image, wherein the nonlinear transformation comprises:
dividing a transfer function of a printer into a plurality of portions, each portion defined by a pair of anchor points;
for each portion of the transfer function, selecting a slope less than 1 if the portion corresponds to a first part of the digital image where the dither pattern will be added; and
for each portion of the transfer function, selecting a slope equal to 1 if the portion corresponds to a second part of the digital image where the dither pattern will not be added.

2. The method of claim 1, wherein the step (A) comprises identifying at least one indeterminate portion of the transfer function.

3. The method of claim 1, wherein the at least one portion of the transfer function comprises a starting point and an end point, and wherein the value of the transfer function at the end point is greater than the value of the transfer function at the starting point.

4. The method of claim 1, further comprising:
(C) printing the dithered image.

5. The method of claim 1, wherein the image, the quantized image, and the dithered image are represented in an n-bit color space, wherein the transformed image and the dithered pre-image are represented in an m-bit color space, and wherein m>n.

6. The method of claim 5, wherein n=8 and wherein m=16.

7. The method of claim 1, further comprising:
(C) prior to performing the operation (B), using a first calibration function to calibrate that subset of the digital image having digits within the at least one range of digital values; and
(D) after performing the operation (B), using a second calibration function to calibrate that subset of the dithered image having digits not within the at least one range of digital values, the second calibration function having a higher precision than the first calibration function.

8. The method of claim 1, wherein for a portion defined by a first anchor point $x_0$ and a second anchor point $x_1$, and the portion corresponding to the first part of the digital image, the selected slope is $1/(x_1-x_0)$.

9. A method of processing a digital image tangibly stored on a first computer-readable medium, the method performed by a computer processor executing computer program instructions tangibly stored on a second computer-readable medium, the method comprising:
applying a nonlinear transformation to the digital image to produce a transformed image;
selectively adding a dither pattern to the transformed image to produce a dithered pre-image;
quantizing the dithered pre-image to produce a quantized image; and
applying an inverse of the nonlinear transformation to the image to produce the dithered image;
wherein the nonlinear transformation comprises:
dividing a transfer function of a printer into a plurality of portions, each portion defined by a pair of anchor points;
for each portion of the transfer function, selecting a slope less than 1 if the portion corresponds to a first part of the digital image where the dither pattern will be added; and
for each portion of the transfer function, selecting a slope equal to 1 if the portion corresponds to a second part of the digital image where the dither pattern will not be added.

10. The method of claim 9, wherein for a portion defined by a first anchor point $x_0$ and a second anchor point $x_1$, and the portion corresponding to the first part of the digital image, the selected slope is $1/(x_1-x_0)$.

11. A device for processing a digital image, the device comprising:
means for identifying at least one non-monotonic portion of a transfer function of a printer, the transfer function relating input digits to output density, the at least one portion having at least one range of digital values which is less than the full range of digital values; and
means for dithering only that subset of the digital image having digits within the at least one range of digital values to produce a dithered image,
wherein the means for dithering comprises:
means for applying a nonlinear transformation to the image to produce a transformed image;
means for selectively adding a dither pattern to the transformed image to produce a dithered pre-image;
means for quantizing the dithered pre-image to produce a quantized image; and
means for applying an inverse of the nonlinear transformation to the image to produce the dithered image,
wherein the means for applying a nonlinear transformation is configured to:
divide a transfer function of a printer into a plurality of portions, each portion defined by a pair of anchor points;
for each portion of the transfer function, select a slope less than 1 if the portion corresponds to a first part of the digital image where the dither pattern will be added; and
for each portion of the transfer function, select a slope equal to 1 if the portion corresponds to a second part of the digital image where the dither pattern will not be added.

12. The device of claim 11, wherein the means for identifying comprises means for identifying at least one indeterminate portion of the transfer function.

13. The device of claim 11, wherein the at least one portion of the transfer function comprises a starting point and an end point, and wherein the value of the transfer function at the end point is greater than the value of the transfer function at the starting point.

14. The device of claim 11, further including:
means for printing the dithered image.

15. The device of claim 11, wherein the image, the quantized image, and the dithered image are represented in an n-bit color space, wherein the transformed image and the dithered pre-image are represented in an m-bit color space, and wherein m>n.

16. The device of claim 11, further comprising:
first calibration means for calibrating that subset of the digital image having digits within the at least one range of digital values; and
second calibration means for calibrating that subset of the dithered image having digits not within the at least one range of digital values, the second calibration function having a higher precision than the first calibration function.

17. The device of claim 11, wherein for a portion defined by a first anchor point $x_0$ and a second anchor point $x_1$, and the portion corresponding to the first part of the digital image, the selected slope is $1/(x_1-x_0)$.

* * * * *